(12) United States Patent
Brandau

(10) Patent No.: US 11,548,200 B2
(45) Date of Patent: Jan. 10, 2023

(54) BLOW MOLDING

(71) Applicant: Apex Container Tech Inc., Guelph (CA)

(72) Inventor: Ottmar Brandau, Guelph (CA)

(73) Assignee: Apex Container Tech Inc., Guelph (CA)

( * ) Notice: Subject to any disclaimer, the term of this patent is extended or adjusted under 35 U.S.C. 154(b) by 23 days.

(21) Appl. No.: 17/231,398

(22) Filed: Apr. 15, 2021

(65) Prior Publication Data

US 2022/0332032 A1    Oct. 20, 2022

(51) Int. Cl.
*B29C 49/04* (2006.01)
*B29C 49/48* (2006.01)
*B29C 49/00* (2006.01)

(52) U.S. Cl.
CPC ............ *B29C 49/04* (2013.01); *B29C 49/071* (2022.05); *B29C 49/48* (2013.01); *B29C 49/04106* (2022.05); *B29C 2049/4856* (2013.01); *B29C 2949/08* (2022.05)

(58) Field of Classification Search
CPC ....... B29C 49/04; B29C 49/071; B29C 49/48; B29C 49/04106; B29C 2949/08; B29C 2049/4856
See application file for complete search history.

(56) References Cited

U.S. PATENT DOCUMENTS

| | | |
|---|---|---|
| 3,702,751 A | 11/1972 | Mehnert |
| 5,785,920 A | 7/1998 | Ogawa et al. |
| 6,214,268 B1 | 4/2001 | Ogawa et al. |
| 7,278,844 B2 | 10/2007 | Koetke et al. |
| 7,448,864 B2 | 11/2008 | Feuerherm |
| 8,235,701 B2 | 8/2012 | Langlais et al. |
| 10,479,013 B2 | 11/2019 | Feuerherm |

*Primary Examiner* — Monica A Huson
(74) *Attorney, Agent, or Firm* — Fish & Richardson P.C.

(57) ABSTRACT

A blow molding assembly includes a die, a mandrel, and a die holder. The die defines an inner wall. The mandrel is disposed at least partially inside the inner wall of the die and defines, with the inner wall of the die, an annular gap that shapes a molten resin passed therethrough, forming a parison. The die holder includes a body and three or more spring-loaded fasteners positioned around an inner perimeter of the body. The spring-loaded fasteners apply pressure to respective positions on an outer surface of the die while permitting movement of the die within a plane that is substantially orthogonal to a longitudinal axis of the mandrel in response to pressure variations of the molten resin, keeping a thickness of the parison substantially even. Each of the spring-loaded fasteners includes a spring-loaded plunger engaging the respective position on the outer surface of the die.

19 Claims, 4 Drawing Sheets

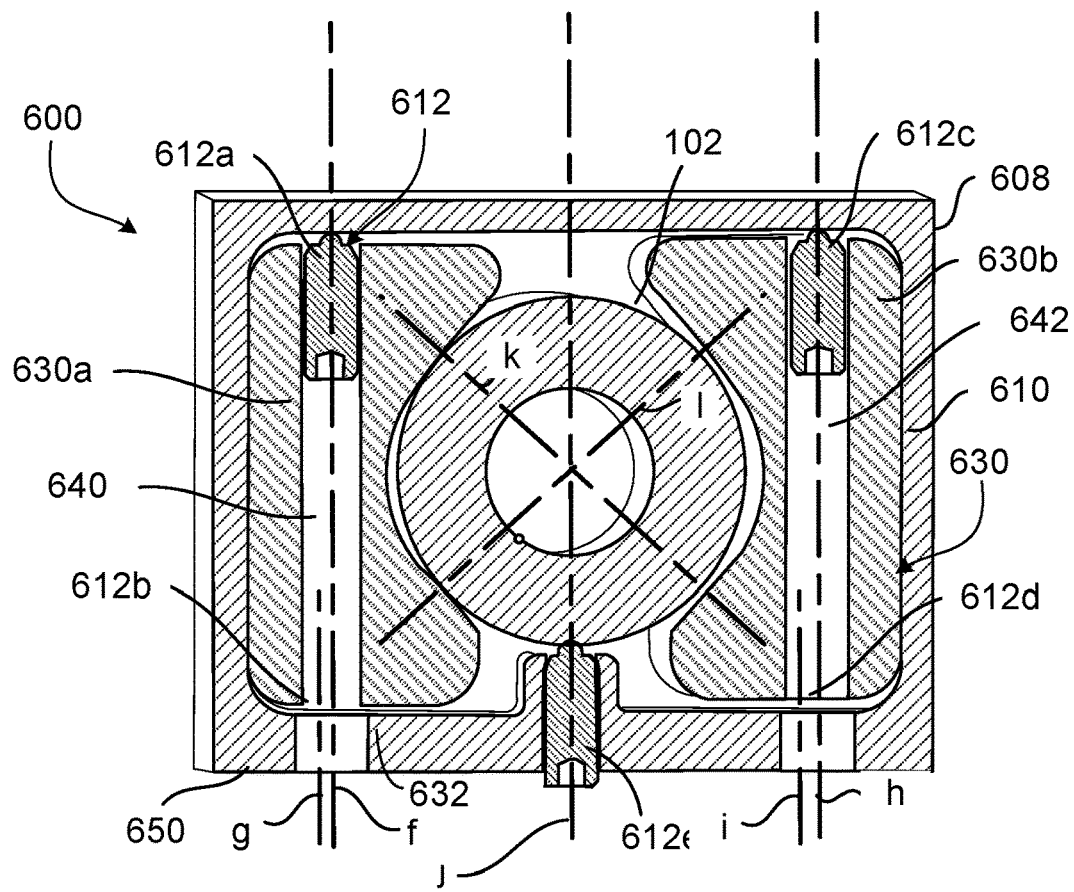

705 — Obtain a ring-shaped die holder comprising three or more spring-loaded fasteners positioned around an inner perimeter of the die holder and configured to bias a body inserted through the ring-shaped die holder 710 — Position, around a die of a molding assembly, the die holder, the molding assembly comprising the die and a mandrel disposed at least partially inside the die and defining, with the die, an annular gap configured to flow molten resin toward an outlet of the die, thereby forming an extruded parison

FIG. 7

BLOW MOLDING

FIELD OF THE DISCLOSURE

This disclosure relates to blow molding methods and equipment.

BACKGROUND OF THE DISCLOSURE

Blow molding is a process used to manufacture hollow objects such as plastic bottles. The process includes extruding molten resin through a mold cavity or annular gap formed between a die and a mandrel disposed inside the die. The extruded resin forms a parison extending from the die. The configuration of the annular gap determines the diameter and thickness of the parison. To form the hollow object, a mold is placed around the parison, and air is introduced inside the parison to inflate the parison against the mold.

Machine operators adjust the parameters of the molding machine to increase the thickness uniformity of the parison. However, because of the effects of temperature and pressure differentials in the resin, maintaining an even annular gap between the die and the mandrel is often insufficient to guarantee a uniform thickness. For example, if one portion of the resin stream moves faster than another portion, the parison may curl to the side of the portion that is moving slower. Such curling can lead to uneven wall thickness in the container, especially at the bottom of the far side, where the plastic travels further. To avoid such curling, a machine operator may push the die towards the slow moving side, reducing the gap at the fast moving side of the die. A parison with thickness variations above acceptable tolerances can delay production and cause costly manufacturing problems. Methods and equipment to increase the thickness uniformity of the parison are sought.

Machine operators have relied on die holders that displace the die in a horizontal direction with a bolt to change the shape of the annular gap. Others have relied on active mechanisms such as linear actuators to move the die and adjust the annular gap. Such adjustments are often performed multiple times a day and they may require pausing production to perform the adjustment. For example, U.S. Pat. No. 5,785,920 discloses a die holder with hydraulic cylinders that displace the die with respect to the mandrel and remain fixed against movement during extrusion.

As another example, U.S. Pat. No. 3,702,751 discloses a die holder with a pin that is pushed by a lever to adjust the annular gap between the die and the mandrel. The pin and lever remain fixed against movement during the molding process.

SUMMARY

Implementations of the present disclosure include a blow molding assembly that includes a die that defines an inner wall. The mandrel is disposed at least partially inside the inner wall of the die and defines, with the inner wall of the die, an annular gap between the mandrel and the inner wall of the die. The annular gap shapes a molten resin passed therethrough, forming a parison. The die holder retains the die. The die holder includes a body and three or more spring-loaded fasteners positioned around an inner perimeter of the body. The spring-loaded fasteners are arranged to apply pressure to respective positions on an outer surface of the die while permitting movement of the die within a plane that is substantially orthogonal to a longitudinal axis of the mandrel in response to pressure variations of the molten resin, keeping a thickness of the parison substantially even. The body of the die holder has a ring-shaped body that is fixed against movement with respect to the mandrel. Each of the spring-loaded fasteners includes a spring-loaded plunger extending through a wall of the body with a respective tip of the plunger exposed, engaging the respective position on the outer surface of the die.

In some implementations, the spring-loaded fasteners include two pairs of spring-loaded fasteners. The spring-loaded fasteners in each pair is positioned opposite each other along a common axis and arranged to exert opposing forces on opposing sides of the die.

In some implementations, the spring-loaded fasteners include an odd number of spring-loaded fasteners each spaced a substantially equal distance from each other and each extending along a respective axis. The axes of the spring-loaded fasteners are configured to cross each other at or near a center of the die holder.

In some implementations, the die holder further includes multiple mechanical fasteners extending through the body of the die holder, securing or fixing the body of the die holder to a head of the blow molding assembly.

In some implementations, the blow molding assembly is a blow molding assembly for non-intermittent blow molding, and the spring-loaded fasteners allow movement of the die with respect to the die holder during continuous extrusion of the molten resin.

In some implementations, the spring-loaded fasteners include a substantially equal preload and stiffness.

In some implementations, each spring-loaded fastener includes a respective mechanical fastener configured to adjust a preload of the spring-loaded fastener. The mechanical fastener adjusts an axial force compressing a spring of the spring-loaded fasteners.

Implementations of the present disclosure include a blow molding assembly that includes a die, a mandrel, and a self-adjusting holder. The mandrel is disposed at least partially inside the die and defines, with the die, an annular gap that flows molten resin toward an outlet of the die, forming an extruded parison extending away from the outlet of the die. The self-adjusting holder is disposed outside the die. The self-adjusting holder includes three or more spring-loaded fasteners that bias the die to center, absent molten resin in the gap, the die with respect to the self-adjusting holder. The three or more spring-loaded fasteners allow, during extrusion of the molten resin, movement of the die with respect to the holder within a plane that is substantially orthogonal with respect to a longitudinal axis of the mandrel, altering a shape of the annular gap and accommodating pressure differences in the molten resin.

In some implementations, the self-adjusting holder includes an internal surface defining, with an external surface of the die, a second annular gap. The spring-loaded fasteners are arranged around the holder and configured to engage the external surface of the die, applying pressure to respective sections of the die while permitting movement of the die within the plane. In some implementations, the self-adjusting holder is fixed against movement with respect to the mandrel. Each of the spring-loaded fasteners extends through a wall of the self-adjusting holder with a respective tip of the spring-loaded fastener exposed, engaging the respective section of the external surface of the die. In some implementations, the spring-loaded fasteners include three or five spring-loaded fasteners positioned around an inner perimeter of the holder. Each of the spring-loaded fasteners spaced a substantially equal distance from each other and each extending along a respective axis extending from or near a center of the self-adjusting holder. In some implementations, the spring-loaded fasteners include two or more pairs of spring-loaded fasteners. The spring-loaded fasteners in each pair are positioned opposite each other along a common axis and arranged to exert opposing forces on opposing sides of the die.

In some implementations, the self-adjusting holder includes as passive holder that does not include any active mechanisms that actively move the die.

In some implementations, the self-adjusting holder includes two opposing adjustment arms each residing at opposite sides of the die. Each arm is movable by at least one of the spring-loaded fasteners to engage and move the die. The spring-loaded fasteners are accessible from a common side of the self-adjusting holder.

In some implementations, each of the spring-loaded fasteners is arranged along a respective axis. Each axis extends substantially parallel with respect to each other. The spring-loaded fasteners include two lateral spring-loaded fasteners and a central spring-loaded fastener disposed between the two lateral spring-loaded fasteners. The central spring-loaded fastener engages an external surface of the die. Each of the two lateral spring-loaded fasteners move a respective arm that engages the external surface of the die.

In some implementations, the spring-loaded fasteners include a substantially equal preload.

Implementations of the present disclosure include a method that includes obtaining a ring-shaped die holder including three or more spring-loaded fasteners positioned around an inner perimeter of the die holder and configured to bias a body inserted through the ring-shaped die holder. The method also includes positioning, around a die of a molding assembly, the die holder. The molding assembly includes the die and a mandrel disposed at least partially inside the die and defining, with the die, an annular gap configured to flow molten resin toward an outlet of the die, forming an extruded parison extending away from the outlet of the die. The spring-loaded fasteners, after positioning the die holder around the die, apply pressure to respective positions on an outer surface of the die while permitting movement of the die within a plane that is substantially orthogonal to a longitudinal axis of the mandrel, accommodating pressure variations in the molten resin and maintaining a substantially even thickness of the extruded parison.

In some implementations, the ring-shaped die holder is configured to self-adjust, continuously adjusting the annular gap between the die and the mandrel during continuous extrusion of the molten resin.

In some implementations, positioning the ring-shaped die holder around the die includes inserting the die through the ring-shaped holder around the die such that an internal surface of the die holder defines, with an external surface of the die, a second annular gap of substantially uniform width. The spring-loaded fasteners are arranged around the die holder and engage the outer surface of the die, applying pressure to respective sections of the die while permitting movement of the die within the plane.

In some implementations, each spring-loaded fastener includes a respective mechanical fastener configured to adjust a preload of the spring-loaded fastener, and the method further includes adjusting, by turning the respective mechanical fastener of one or more spring-loaded fasteners, an axial load compressing a spring of the respective spring-loaded fastener.

Implementations of the present disclosure include a blow molding assembly that includes a die, a mandrel disposed at least partially inside the die, and a die holder disposed around the die. The die together with the mandrel defines an annular gap arranged to shape a molten resin passed therethrough into a parison. The die holder includes a body and three or more spring-loaded fasteners positioned around an inner perimeter of the body. The spring-loaded fasteners are arranged to apply pressure to respective positions on an outer surface of the die while permitting movement of the die within a plane that is substantially orthogonal to a longitudinal axis of the mandrel in response to pressure variations of the molten resin, thereby altering a shape of the annular gap.

Implementations of the present disclosure include a blow molding assembly that includes a die, a mandrel, and a die holder. The mandrel is disposed at least partially inside the die and defines, with the die, an annular gap configured to shape a molten resin flowing therethrough, forming a parison. The die holder retains the die. The die holder includes a body, two opposing arms, and multiple spring-loaded fasteners. The two opposing arms are disposed inside the body and are arranged to bias the die. The multiple spring-loaded fasteners are arranged to move the two opposing arms. The multiple spring-loaded fasteners are attached to the body or a respective arm of the two opposing arms. Each of the spring-loaded fasteners is arranged along an axis extending parallel with respect to axes of the other spring-loaded fasteners such that each of the plurality of spring-loaded fasteners is accessible or adjustable from a common side of the body. The multiple spring-loaded fasteners are arranged to move the two opposing arms such that the two opposing arms apply pressure to respective positions on an outer surface of the die while permitting movement of the die within a plane that is substantially orthogonal to a longitudinal axis of the mandrel in response to pressure variations of the molten resin, thereby keeping a shape of the annular gap substantially even.

Particular implementations of the subject matter described in this specification can be implemented so as to realize one or more of the following advantages. For example, the die holder of the present invention increases the thickness uniformity of the parison without active mechanisms and without the need of manually adjusting the annular gap between the die and the mandrel. The die holder of the present invention can satisfy manufacturing requirements that may include zero or near zero defects or variations of the thickness of the parison. Satisfying such manufacturing requirements can reduce the cost of quality control measures and prevent costly sorting or disposing of manufactured goods. Satisfying such manufacturing requirements can also save time and resources, and minimize or eliminate the production interruptions involved with manually adjusting the annular gap. Additionally, the die holder of the present invention can allow a continuous extrusion assembly to run uninterruptedly for more than a month without the need of adjusting the die holder or the position of the die.

BRIEF DESCRIPTION OF THE DRAWINGS

FIG. 6 is a top schematic view, cross-sectional of a molding assembly according to a second implementation of the present disclosure.

FIG. 7 is a flow chart of an example method of assembling a molding assembly.

DETAILED DESCRIPTION OF THE DISCLOSURE

Figure 1:
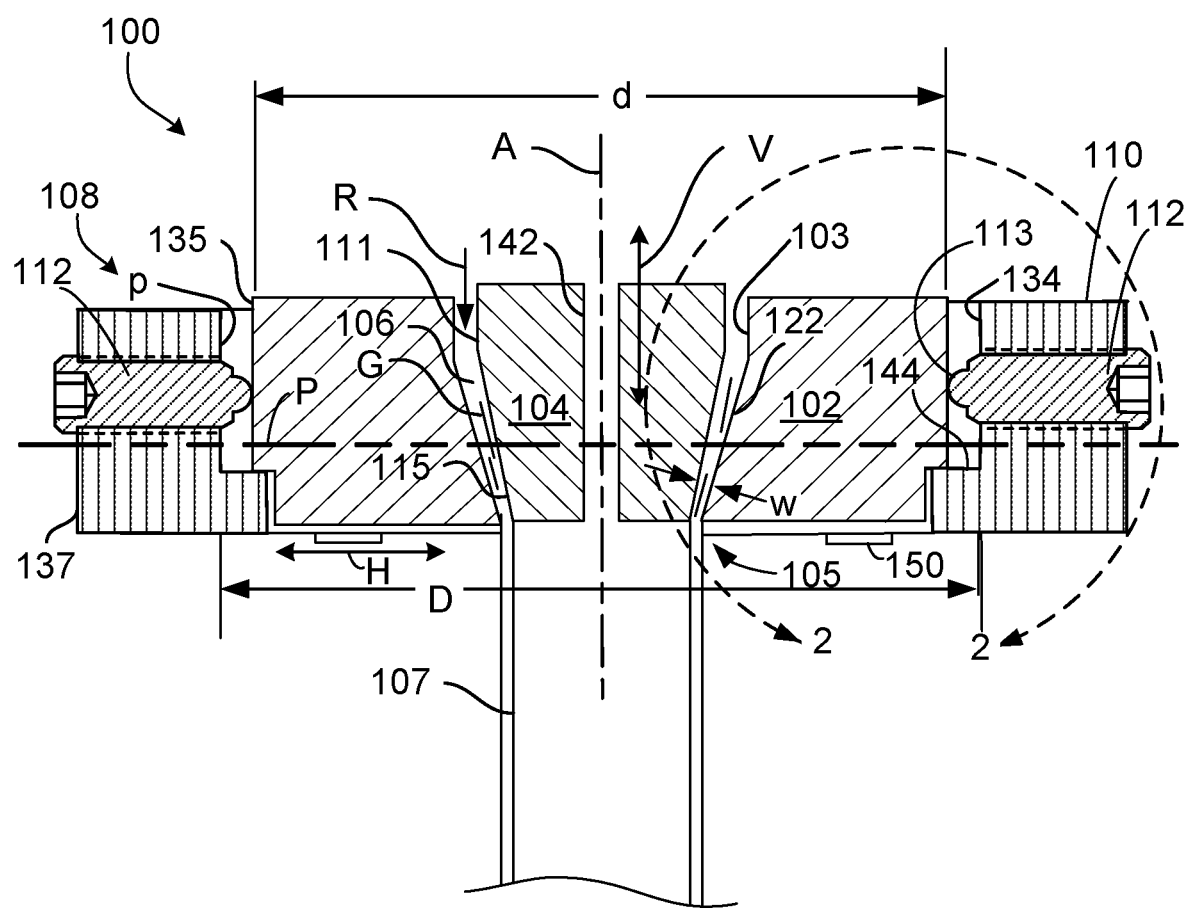
FIG. 1 is a front schematic view, cross-sectional, of a molding assembly according to a first implementation of the present disclosure.

FIG. 1 depicts a blow molding assembly 100 that includes a die 102, a mandrel 104 or pin, and a die holder 108. The blow molding assembly 100 forms a parison 107 by forcing material (e.g., molten resin) between the die 102 and the mandrel 104. The molding assembly 100 has an annular outlet 105 through which the material leaves the molding assembly 100 to form the parison 107. Forcing the molten resin through the outlet 105 can be referred to as the "extrusion process." The parison 107 can be a hollow tube that may be shaped into a structure such as a bottle by sealing one end and injecting air inside the hollow tube. The shape of the structure is defined by a mold that is placed outside the parison 107 during the blowing molding process.

The mandrel 104 includes a fluid channel 142 that flows air (e.g., compressed air) into the parison to blow or expand the parison and prevent the parison from collapsing. The annular outlet 105 can be changed by moving either the mandrel or the die (depending on the style of installation) a vertical direction "V" along a central longitudinal axis "A." This allows adjusting the thickness of the parison to the shape of the blow molded container. The mandrel 104 is fixed against movement in a horizontal direction "H." As shown in FIG. 1, the mandrel 104 can be a converging mandrel with a tip 115 of the mandrel converging toward the outlet 105 of the molding assembly 100 and a die end 122 converging in a corresponding direction. In some implementations, the mandrel 104 can be a diverging mandrel, with the tip 115 of the mandrel 104 diverging toward the outlet 105 of the molding assembly 100 and the die end 122 diverging in a corresponding direction. The mandrel 104 can be partially disposed inside the die 102, with a portion of the mandrel 104 extending above the die 102.

The die 102 has an aperture 106 that receives the mandrel 104. The aperture 106 has an inner wall 103 (e.g., an internal surface) extending to the outlet 105. The mandrel 104 is disposed at least partially inside the inner wall 103. The inner wall 103 defines, in combination with an outer wall 111 (e.g., an external surface) of the mandrel 104, an annular gap "G" or cavity. The annular gap "G" has a width "w" that can decrease toward the outlet 105 of the molding assembly 100. The molding assembly 100 flows the molten resin "R" through the annular gap "G" such that the molten resin "R" surrounds the mandrel 104. The gap "G" shapes the molten resin "R" as the molten resin "R" passes through the gap "G," forming a parison as the resin exits the gap "G" through the outlet 105.

The die holder 108 resides outside the die 102 to engage and retain the die 102. The die holder 108 has a ring-shaped body 110 (e.g., a circular metal enclosure or ring) that receives and retains the die 102. The die holder 108 can include an inwardly projecting shoulder 144 that supports the die 102 and prevents the die 102 from moving vertically in a downward direction. As further described in detail below with respect to FIGS. 2-5, the blow molding assembly 100 can be a continuous (e.g., non-intermittent) or discontinuous (e.g., intermittent) blow molding assembly. In a continuous blow molding assembly, the molten resin "R" moves continuously through the die gap. In a discontinuous blow molding assembly, the resin "R" is stored in an accumulator head and subsequently pushed through the die gap after a short period of time (e.g., after seconds).

The die holder 108 is mounted to a head of the blow molding machine. For example, the die holder 108 has mechanical fasteners 150 that extend through the body 110 and secure the die holder 108 to the head. The head is fixed against movement and by extension the body 110 of the die holder 108 is fixed against movement with respect to the head.

The die holder 108 is a self-adjusting or self-balancing die holder that utilizes spring-loaded fasteners to continuously adjust the annular gap "G" during the extrusion process. For example, the die holder 108 has three or more spring-loaded fasteners 112 positioned around an inner perimeter "p" of the body 110 of the holder 108. The spring-loaded fasteners 112 apply pressure to respective positions (e.g., points or sections) on an outer surface 135 of the die 102 while permitting movement of the die 102 in the horizontal direction "H." In other words, the die holder 108 retains the die 102 while allowing movement of the die 102 within a plane "P" that is substantially orthogonal to the longitudinal axis "A" of the mandrel 104. The body 110 of the die holder 108 is fixed against movement with respect to the mandrel 104. Specifically, the body 110 is fixed to the molding assembly 100 to prevent horizontal and vertical movement of the holder 108 during the extrusion process.

Multiple parameters of the molten resin "R" can cause horizontal movement of the die 102, such as pressure variations and temperature variations in the resin "R." Pressure changes in the resin "R" can be caused by the resin "R" being pushed through a variety of melt channels that may be slightly uneven. Even miniscule differences in melt channel dimensions and surface structure can cause an uneven pressure distribution in the resin "R."

As the resin "R" experiences pressure differentials, the spring-loaded fasteners 112 allow the resin "R" to slightly alter a shape of the annular gap "G" as the resin "R" flows through the annular gap "G." The spring-loaded fasteners 112 can be spring-loaded plungers that extend through a wall 137 of the body 110. A respective tip 113 of each plunger is exposed to engage the respective position on the external surface 135 of the die 102, while allowing the resin "R" to move the die 102 and thus change the shape of the annular gap "G," and may maintain the shape of the annular gap substantially even.

Slight changes in temperature and pressure in the course of a workday can and do lead to changes in the composition of the parison 107 that result in uneven wall thickness distribution. For example, due to the characteristics of the resin and the effects of friction and heat, when the pressure at one side of the annular gap increases, the pressure can cause the parison in that area to run faster than the area directly across it. As a result, the parison becomes skewed in the direction opposite of the increased pressure. For example, if the pressure increases on the right side of the annular gap, the parison will be skewed to the left side. When the mold receives the skewed parison, the inflation distance towards the right side of the mold is longer and the parison will thin out compared to the left side. As a result, the blown container may have thicker walls on the left side compared to the right.

The spring-loaded fasteners 112 of the die holder 108 help distribute the pressure in gap "G" evenly by compression of the springs inside the fasteners, allowing the die 102 to move in any radial direction. For example, when a first area of the die gap "G" experiences an increase in pressure, the die 102 moves to increase a width of the gap "G" of the first area, which decreases a width of the gap "G" of a second area of the gap "G" directly opposite from the first area (e.g., located 180° from the first area). The movement of the die 102 pushes against a spring-loaded fastener 112 that is at or near the second area, resulting in an increase in the force of the spring inside the fastener 112, thereby resisting the push of the die 102 and evenly distributing the pressure along the gap "G."

The ring-shaped body 110 has an internal surface 134 with a diameter "D" that is larger than a diameter "d" of an external surface 135 of the die 102. Together, the internal surface 134 and the external surface 135 form a second annular gap that allows the die 102 to move along any direction within the horizontal plane "P." The diameter "D" of the body 110 can be, for example, 2 to 3 millimeters larger than the diameter "d" of the die 102. The spring-loaded fasteners 112 engage the external surface 135 of the die 102 and bias the die 102 to center (e.g., align concentrically) the die 102 with respect to the die holder 108, absent molten resin in the annular gap "G." In other words, when the molding assembly 100 is not running, the second annular gap can have a substantially uniform width. As molten resin is passed through the annular gap "G" the spring-loaded fasteners 112 permit pressure variations in the resin to shift the die 102 along any direction within the horizontal plane "P."

Figure 2:
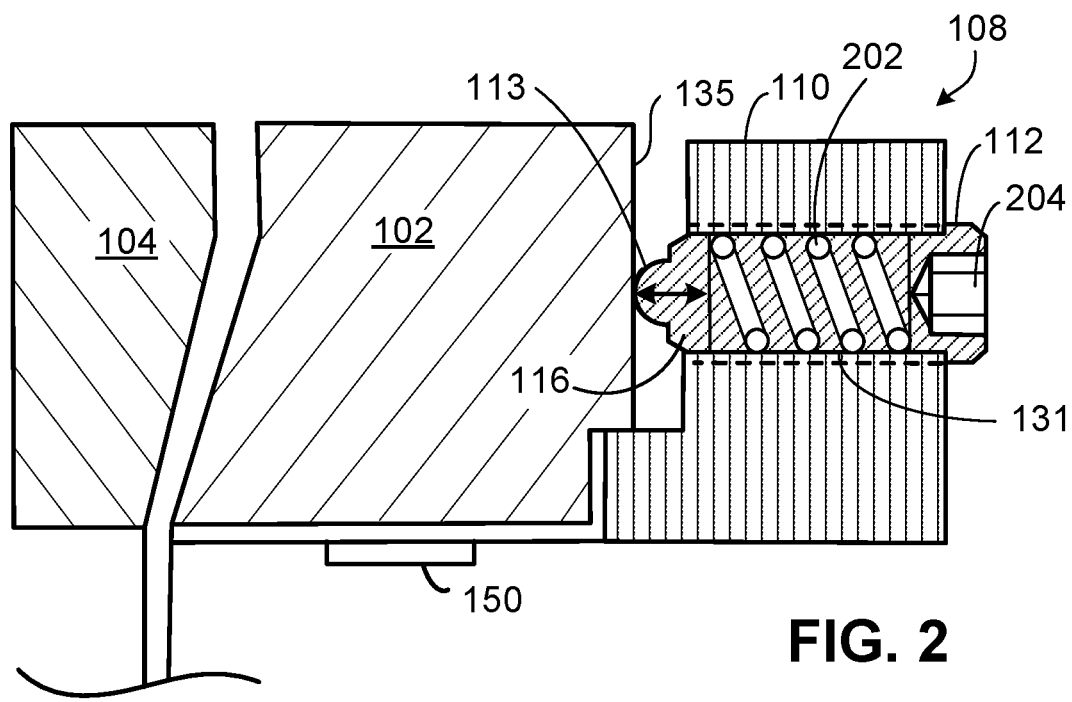
FIG. 2 is a front schematic view taken along line 2-2 in FIG. 1.

Referring now to FIG. 2, each spring-loaded fastener 112 has a spring 202 and a pin 116 (e.g., a plunger, a nose, or a ball) that is biased by the spring 202 toward the die 102. The spring 202 is disposed inside a sleeve 131 of the spring-loaded fasteners 112, between the pin 116 and an opposite end of the spring-loaded fastener 112. The sleeve 131 is attached (e.g., threadedly attached) to the body 110 of the die holder 108. The pin 113 is partially disposed inside the sleeve 131, with a tip 113 of the pin 116 exposed to engage the external surface 135 of the die 102.

Each spring-loaded fastener 112 can have a substantially equal preload. For example, the spring 202 of each spring-loaded fastener 112 can have the same mechanical properties (e.g., stiffness and strength) and can have the same pre-load. To adjust a pre-load of the spring 202, each spring-loaded fastener 112 can have a mechanical fastener 204 (e.g., a nut, set-screw) that is turned with respect to the sleeve 131 to adjust an axial load compressing the spring 202. Additionally, the pre-load of the spring 202 can be adjusted by moving the sleeve 131 toward the die 102. In some implementations, the spring-loaded fastener 112 does not have a nut 204 and the pre-load of the spring 202 is only adjusted by turning the sleeve 131.

Figure 3:
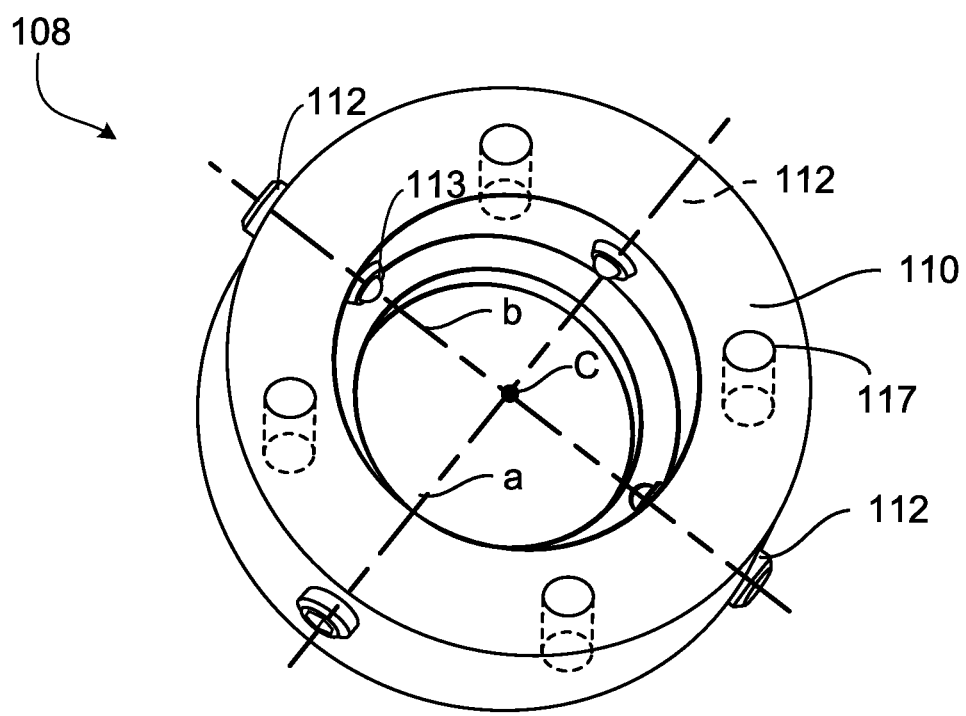
FIG. 3 is a top perspective view of a die holder according to a first implementation of the present disclosure.

As shown in FIG. 3, the die holder 108 can have two or more pairs of spring-loaded fasteners 112. The spring-loaded fasteners 112 in each pair can oppose each other (e.g., with their respective tips 113 facing each other) and be arranged along a common axis. Such configuration allows the spring-loaded fasteners 112 to exert opposing forces on opposing sides of the die 102. For example, a first pair of spring-loaded fasteners 112 can be disposed along a first axis "a," and a second pair of spring-loaded fasteners 112 can be disposed along a second axis "b" perpendicular with respect to the first axis "a." Both axes "a" and "b" can cross through a center "C" of the ring-shaped body 110. The spring-loaded fasteners 112 can be arranged along a common horizontal plane of the ring-shaped body 110. The body 110 of the holder 108 can have multiple holes 117 that receive a mechanical fastener to secure the body 110 to the head of the blow molding machine.

In some implementations, the self-adjusting die holder 108 does not include any active mechanisms (e.g., actuators or levers). Active mechanisms can refer to any mechanism that uses an external energy source or input such as electrical or mechanical energy to move or damp the die 102. Active mechanisms may or may not rely on inputs such as sensor inputs to move the die 102. The die holder 108 passively moves or centers the die 102 by way of spring-loaded fasteners. The spring-loaded fasteners 112 allow continuous movement of the die 102 during the extrusion process. For example, during non-intermittent blow molding, the spring-loaded fasteners 112 continuously accommodate the movement of the die 102 caused by pressure differentials in the resin during the extrusion of the resin. In some implementations, the blow molding assembly can also be used in intermittent extrusion assemblies.

In some implementations, the mechanical fasteners 204 can be coupled to an active mechanism that makes automatic adjustments. For example, the mechanical fasteners 204 may require pre-load adjustments for maintenance or when changing out dies. An active mechanism (e.g., an electrical drive) may be coupled to the die holder 108 in some implementations to automatically adjust the mechanical fasteners 204.

Figure 4:
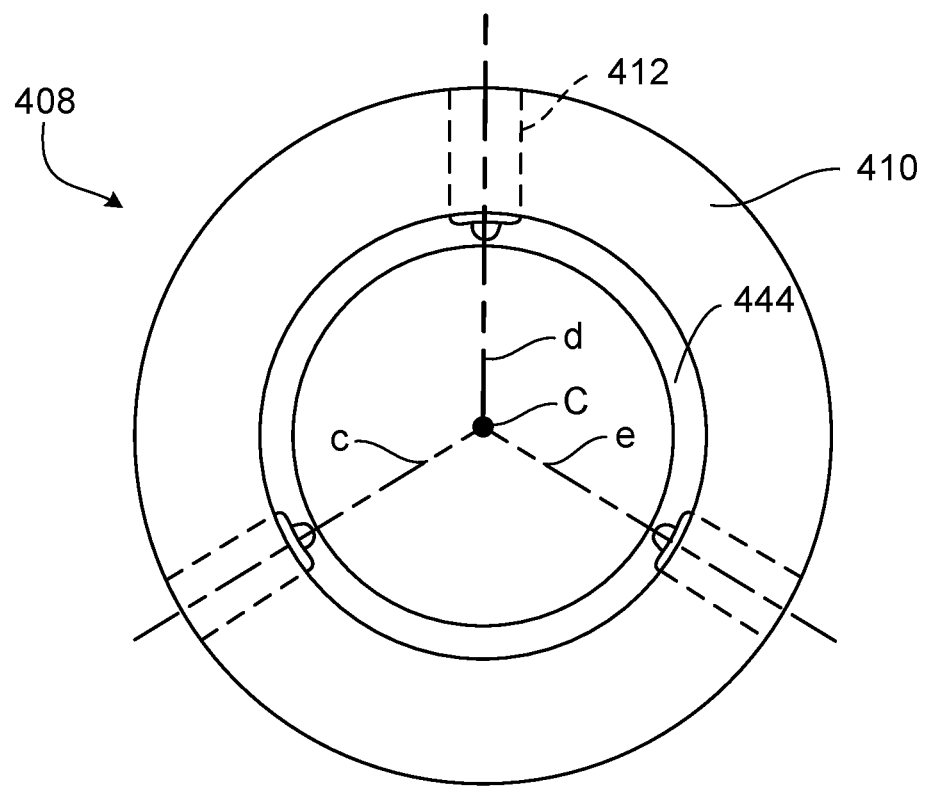
FIG. 4 is a top view of a die holder according to a second implementation of the present disclosure.
Figure 5:
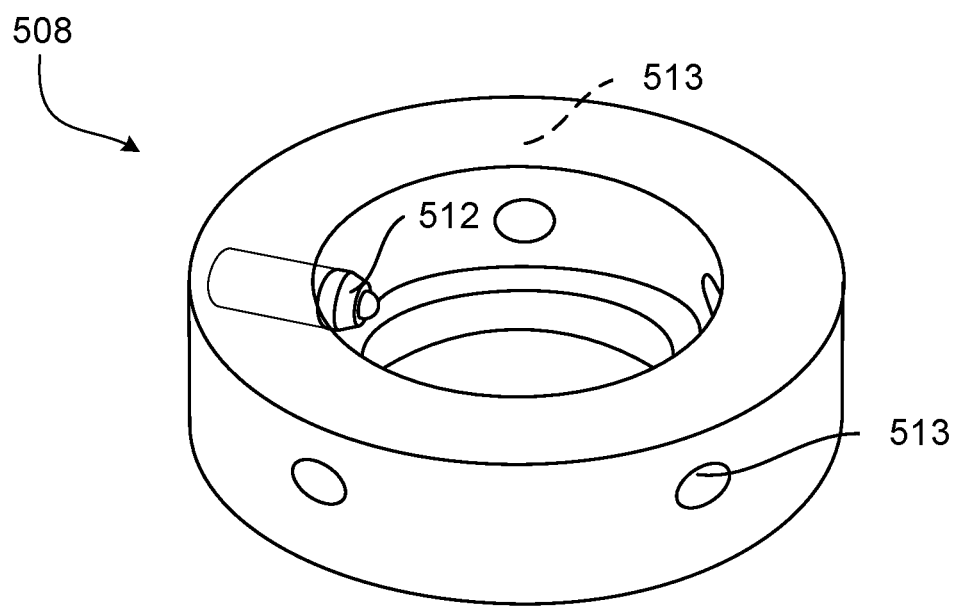
FIG. 5 is a perspective view of a die holder according to a third implementation of the present disclosure.

As shown in FIGS. 4 and 5, the die holder 408 can have an odd number of spring-loaded fasteners. For example, as shown in FIG. 4, the ring-shaped body 410 of the die holder 408 includes three spring-loaded fasteners 412 distributer evenly along the circumference of the body 110. Each spring-loaded fastener 412 is spaced a substantially equal distance (e.g., circumferential distance) from each other to form, with a line connecting the tips of each fastener 412, a triangle. Each spring-loaded fastener 412 extends along a respective axis "c," "d," and "e." The axes "c," "d," and "e" can cross each other at or near a center "C" of the die holder. In other words, each axis extends from or near a center "C" of ring-shaped body 410. FIG. 5 shows a similar die holder, 508 but arranged to hold five spring-loaded fasteners 512. The die holder 508 has five apertures 513 each arranged along a respective axis extending from a center of the die holder 508.

Experiments were performed to test the performance of the die holder. A die holder similar to the embodiment shown in FIG. 3 was tested in conjunction with two other, standard die holders that lacked the spring-loaded fasteners. These were the results of the experiment:

1) The die holder of the present disclosure was run for 32 days for on average 23 hours/day without the need of adjustments. During those days, the die holder produced a parison that satisfied all manufacturing/tolerance requirements.
2) The standard die holders needed adjustments on average twice per 8-hour shift.

FIG. 6 shows a blow molding assembly 600 according to a different implementation. The blow molding assembly 600 includes a self-adjusting die holder 608 that has a body 610, two opposing adjustment arms 630, and multiple spring-loaded fasteners 612. The die holder 608 allows all pre-load adjustments to be made from one side (e.g., from the front) of the blow molding assembly 600. For example, in multi-cavity applications and other embodiments, it can be difficult for an operator to adjust the fasteners in the back of the die holder. The fasteners 612 are accessible from a common side of the holder 608 so that an operator can adjust the pre-load of the fasteners 612 from a common side.

The two opposing arms 630 are arranged inside the body to bias the die 102. Each adjustment arm 630 resides at opposite sides of the die 102. Respective ones of the spring-loaded fasteners 612 move the adjustment arms 360, and the arms 630 engage or apply pressure to respective positions on an outer surface of the die 102 while permitting movement of the die 102, similar to the die holder in FIGS. 1-5.

The spring-loaded fasteners 612 are attached to the body 610 of the die holder 608 or to a respective adjustment arm 630. Each of the spring-loaded fasteners 612 is arranged along an axis extending parallel with respect to axes of the other spring-loaded fasteners 612. For example, a first spring-loaded fastener 612a attached to a first adjustment arm 630a is arranged along a first axis "f." A second spring-loaded fastener 612b attached to the body 610 is arranged along a second axis "g." A third spring-loaded fastener 612c attached to a second adjustment arm 630b is arranged along a third axis "h." A fourth spring-loaded fastener 612d attached to the body 610 is arranged along a fourth axis "i." A fifth spring-loaded fastener 612e attached to the body 610 is arranged along a fifth axis "j." Each axis "f," "g," "h," "i," and "j" extends substantially parallel with respect to each other. Each spring-loaded fastener 612 can be accessed from the front of the body 608 to adjust the preload of the fasteners 612. For example, the first spring-loaded fastener 612a is disposed inside a hole 640 of the first adjustment arm 630a, and a tool can access the fastener 612a through the hole 640. The third spring-loaded fastener 612c is disposed inside a hole 642 of the second adjustment arm 630b, and a tool can access the fastener 612c through the hole 642. The second, fourth, and fifth spring-loaded fasteners 612b, 612d, and 612e are accessible from are exposed at the front surface 650 of the body 610. The second and fourth spring-loaded fasteners 612b and 612d are disposed below the holes 640 and 642 and contact a surface of the arms below the holes 640 and 642.

The fasteners 612 can have different strengths or pre-loads such that the two adjustment arms 630 are balanced by fasteners of different strengths. For example, the first and third spring-loaded fastener 612a and 612c can be larger than the second and fourth spring-loaded fasteners 612b and 612d. The two small fasteners 612b and 612d push the arm away from the front surface 650 and the two large fasteners 612a and 612a push the arms toward the front surface 650. The two large fasteners 612a and 612a can have a larger pre-load than the pre-load of the small fasteners to balances the force of the two smaller fasteners. In some implementations, the blow molding assembly can include four small fasteners instead of two (e.g., seven spring-loaded fasteners in total). For example, the two small fasteners 612b and 612d can be disposed below the plane (e.g., below holes 640 and 642) of the large fasteners 612a and 612c, and the other two small fasteners can be disposed above (e.g., vertically aligned with fasteners 612b and 612d) the plane of the large fasteners 612a and 612c, The fifth fastener 612e can be disposed at the center of the body 610. The fifth fastener 612e pushes the die 102 to further balance or adjust the gap between the die and the mandrel. The curves in the adjustment arms 630 allow the arms 630 to push the die 102 along axes "k" and "l" (e.g., in the direction that is 45° with respect to the "j" axis) and in any direction in between. Thus, the spring-loaded fasteners 612 together with the arms 612 functions similar to the embodiments in FIGS. 1-5 by allowing small movement of the die while continuously adjusting the gap between the die and the mandrel.

FIG. 7 shows a flow chart of an example method 700 of assembling a molding assembly (e.g., the molding assembly 100 shown in FIG. 1). The method 700 includes obtaining a ring-shaped die holder that includes three or more spring-loaded fasteners positioned around an inner perimeter of the die holder and configured to bias a body inserted through the ring-shaped die holder (705). The method also includes positioning, around a die of a molding assembly, the die holder. The molding assembly includes the die and a mandrel disposed at least partially inside the die and defines, with the die, an annular gap configured to flow molten resin toward an outlet of the die, thereby forming an extruded parison extending away from the outlet of the die (710).

Although the following detailed description contains many specific details for purposes of illustration, it is understood that one of ordinary skill in the art will appreciate that many examples, variations and alterations to the following details are within the scope and spirit of the disclosure. Accordingly, the exemplary implementations described in the present disclosure and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a," "an" and "the" include plural referents, unless the context clearly dictates otherwise.

As used herein, the terms "orthogonal" or "substantially orthogonal" refer to a relation between two elements (e.g., lines, axes, planes, surfaces, or components) that form a ninety-degree (perpendicular) angle within acceptable engineering, machining, or measurement tolerances. For example, two surfaces can be considered orthogonal to each other if the angle between the surfaces is within an acceptable tolerance of ninety degrees (e.g., ±1-2 degrees).

As used herein, the terms "aligned," "substantially aligned," "parallel," or "substantially parallel" refer to a relation between two elements (e.g., lines, axes, planes, surfaces, or components) as being oriented generally along the same direction within acceptable engineering, machining, drawing measurement, or part size tolerances such that the elements do not intersect or intersect at a minimal angle. For example, two surfaces can be considered aligned with each other if surfaces extend along the same general direction of a device or component.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A blow molding assembly comprising:
   a die defining an inner wall;
   a mandrel disposed at least partially inside the inner wall of the die and defining, with the inner wall of the die, an annular gap between the mandrel and the inner wall of the die, the annular gap configured to shape a molten resin passed therethrough, forming a parison; and
   a die holder configured to retain the die, the die holder comprising:
   a body;
   a plurality of mechanical fasteners extending through the body of the die holder, the plurality of mechanical fasteners securing the body of the die holder to a head of the blow molding assembly; and
   three or more spring-loaded fasteners positioned around an inner perimeter of the body, the spring-loaded fasteners arranged to apply pressure to respective positions on an outer surface of the die while permitting movement of the die within a plane that is substantially orthogonal to a longitudinal axis of the mandrel in response to pressure variations of the molten resin, thereby keeping a thickness of the parison substantially even;
   wherein the body of the die holder comprises a ring-shaped body that is fixed against movement with respect to the mandrel, and wherein each of the spring-loaded fasteners comprises a spring-loaded plunger extending through a wall of the body with a respective tip of the plunger exposed, thereby engaging the respective position on the outer surface of the die.

2. The blow molding assembly of claim 1, wherein the spring-loaded fasteners comprise two pairs of spring-loaded fasteners, the spring-loaded fasteners in each pair positioned opposite each other along a common axis and arranged to exert opposing forces on opposing sides of the die.

3. The blow molding assembly of claim 1, wherein the spring-loaded fasteners comprise an odd number of spring-loaded fasteners each spaced a substantially equal distance from each other and each extending along a respective axis, the axes of the spring-loaded fasteners configured to cross each other at or near a center of the die holder.

4. The blow molding assembly of claim 1, wherein the blow molding assembly is a blow molding assembly for non-intermittent blow molding, and the spring-loaded fasteners are configured to allow movement of the die with respect to the die holder during continuous extrusion of the molten resin.

5. The blow molding assembly of claim 1, wherein the spring-loaded fasteners comprise a substantially equal preload and stiffness.

6. The blow molding assembly of claim 5, wherein each spring-loaded fastener comprises a respective mechanical fastener configured to adjust a preload of the spring-loaded fastener, the mechanical fastener configured to adjust an axial force compressing a spring of the spring-loaded fasteners.

7. A blow molding assembly comprising:
   a die;
   a mandrel disposed at least partially inside the die and defining, with the die, an annular gap configured to flow molten resin toward an outlet of the die, thereby forming an extruded parison extending away from the outlet of the die;
   a self-adjusting holder disposed outside the die, the self-adjusting holder comprising three or more spring-loaded fasteners configured to bias the die to center, absent molten resin in the gap, the die with respect to the self-adjusting holder, and the three or more spring-loaded fasteners configured to allow, during extrusion of the molten resin, movement of the die with respect to the holder within a plane that is substantially orthogonal with respect to a longitudinal axis of the mandrel, thereby altering a shape of the annular gap and accommodating pressure differences in the molten resin; and
   a plurality of mechanical fasteners extending through a body of the self-adjusting holder, the plurality of mechanical fasteners securing the body of the die holder to a head of the blow molding assembly.

8. The blow molding assembly of claim 7, wherein the self-adjusting holder comprises an internal surface defining, with an external surface of the die, a second annular gap, the spring-loaded fasteners arranged around the holder and configured to engage the external surface of the die, thereby applying pressure to respective sections of the die while permitting movement of the die within the plane.

9. The blow molding assembly of claim 8, wherein the self-adjusting holder is fixed against movement with respect to the mandrel, and wherein each of the spring-loaded fasteners extends through a wall of the self-adjusting holder with a respective tip of the spring-loaded fastener exposed, thereby engaging the respective section of the external surface of the die.

10. The blow molding assembly of claim 8, wherein the spring-loaded fasteners comprise three or five spring-loaded fasteners positioned around an inner perimeter of the holder, each of the spring-loaded fasteners spaced a substantially equal distance from each other and each extending along a respective axis extending from or near a center of the self-adjusting holder.

11. The blow molding assembly of claim 8, wherein the spring-loaded fasteners comprise two or more pairs of spring-loaded fasteners, the spring-loaded fasteners in each pair positioned opposite each other along a common axis and arranged to exert opposing forces on opposing sides of the die.

12. The blow molding assembly of claim 7, wherein the self-adjusting holder comprises as passive holder that does not include any active mechanisms configured to actively move the die.

13. The blow molding assembly of claim 7, wherein the self-adjusting holder comprises two opposing adjustment arms each residing at opposite sides of the die, each arm movable by at least one of the spring-loaded fasteners to engage and move the die, the spring-loaded fasteners accessible from a common side of the self-adjusting holder.

14. The blow molding assembly of claim 13, wherein each of the spring-loaded fasteners is arranged along a respective axis, each axis extending substantially parallel with respect to each other, the spring-loaded fasteners comprising two lateral spring-loaded fasteners and a central spring-loaded fastener disposed between the two lateral spring-loaded fasteners and configured to engage an external surface of the die, each of the two lateral spring-loaded fasteners configured move a respective arm that engages the external surface of the die.

15. The blow molding assembly of claim 7, wherein the spring-loaded fasteners comprise a substantially equal preload.

16. A method comprising:
obtaining a ring-shaped die holder comprising three or more spring-loaded fasteners positioned around an inner perimeter of the die holder and configured to bias a body inserted through the ring-shaped die holder; and
positioning, the die holder around a die of a molding assembly, the molding assembly comprising the die and a mandrel disposed at least partially inside the die and defining, with the die, an annular gap configured to flow molten resin toward an outlet of the die, thereby forming an extruded parison extending away from the outlet of the die, the positioning comprising securing, with a plurality of mechanical fasteners extending through a body of the ring-shaped die holder, the body of the die holder to a head of the molding assembly;
wherein the spring-loaded fasteners are configured, after positioning the die holder around the die, to apply pressure to respective positions on an outer surface of the die while permitting movement of the die within a plane that is substantially orthogonal to a longitudinal axis of the mandrel, thereby accommodating pressure variations in the molten resin and maintaining a substantially even thickness of the extruded parison.

17. The method of claim 16, wherein the ring-shaped die holder is configured to self-adjust, thereby continuously adjusting the annular gap between the die and the mandrel during continuous extrusion of the molten resin.

18. The method of claim 16, wherein positioning the ring-shaped die holder around the die comprises inserting the die through the ring-shaped holder around the die such that an internal surface of the die holder defines, with an external surface of the die, a second annular gap of substantially uniform width, the spring-loaded fasteners arranged around the die holder and configured to engage the outer surface of the die, thereby applying pressure to respective sections of the die while permitting movement of the die within the plane.

19. The method of claim 16, wherein each spring-loaded fastener comprises a respective mechanical fastener configured to adjust a preload of the spring-loaded fastener, and the method further comprises adjusting, by turning the respective mechanical fastener of one or more spring-loaded fasteners, an axial load compressing a spring of the respective spring-loaded fastener.

* * * * *